(12) United States Patent
Cheng et al.

(10) Patent No.: US 8,449,953 B2
(45) Date of Patent: May 28, 2013

(54) CHIRAL DOPANTS, LIQUID CRYSTAL MATRIX AND MANUFACTURING METHOD THEREOF AND LIQUID CRYSTAL DISPLAY

(75) Inventors: Chien-Hsien Cheng, Tainan (TW);
Kuo-Chang Wang, Taichung (TW);
Chun-Ming Wu, Banqiao (TW);
Kung-Lung Cheng, Hsinchu (TW);
Shih-Hsien Liu, Jhubei (TW);
Chih-Lung Chin, Longtan Township, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/363,767

(22) Filed: Feb. 1, 2012

(65) Prior Publication Data
US 2013/0063693 A1    Mar. 14, 2013

(30) Foreign Application Priority Data
Sep. 9, 2011  (TW) ............... 100132535 A

(51) Int. Cl.
*C09K 19/52* (2006.01)
*C09K 19/58* (2006.01)
*C07C 25/13* (2006.01)
*C07C 69/78* (2006.01)
*C07C 23/10* (2006.01)

(52) U.S. Cl.
USPC ............. 428/1.1; 252/299.01; 252/299.5; 560/80; 560/256; 570/127; 570/129; 570/131

(58) Field of Classification Search
CPC .. C09K 19/586; C09K 19/32; C09K 2019/327; C07C 69/78
USPC .............. 252/299.01, 299.5; 568/731.732, 568/734; 560/80, 256; 570/127, 129, 131; 428/1.1
See application file for complete search history.

(56) References Cited

U.S. PATENT DOCUMENTS

| | | | |
|---|---|---|---|
| 6,028,161 | A | 2/2000 | Otsuji et al. |
| 6,723,395 | B2 | 4/2004 | May et al. |
| 7,052,743 | B2 | 5/2006 | Welter et al. |
| 7,150,900 | B2 | 12/2006 | Welter |
| 2004/0097662 | A1 | 5/2004 | Gaggar et al. |
| 2010/0309423 | A1 | 12/2010 | Bernatz et al. |

FOREIGN PATENT DOCUMENTS
TW      200833671      8/2008

OTHER PUBLICATIONS

Stenzel et al., "Bis(2,4,7-trimethylindenyl)cobalt(II) and rac-2,2',4,4',7,7'-hexamethyl-1,1'-biindene", Acta Cryst., (2001), pp. 1056-1059, C57.

Caccamese et al., "Chiral HPLC Separation and CD Spectra of the Enantiomers of a Molecular 'Hamburger'", Elsevier—Mendeleev Commun., (2004), pp. 237-239, vol. 14(6).

Köhler et al., "Novel Chiral Macrocycles Containing Two Electronically Interacting Arylene Chromophores", Chem. Eur. J., (2001), pp. 3000-3004, vol. 7, No. 14.

Kumar Sen et al., "Spiro-Biindane Containing Fluorinated Poly(ether imide)s: Synthesis, Characterization and Gas Separation Properties", Elsevier—Journal of Membrane Science, (2010), pp. 329-340, vol. 365.

*Primary Examiner* — Shean C Wu
(74) *Attorney, Agent, or Firm* — Muncy, Geissler, Olds & Lowe, PLLC

(57) ABSTRACT

An embodiment of the invention provides a chiral dopant having the following formula:

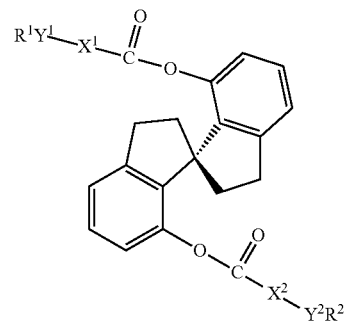

wherein $X^1$ and $X^2$ are independently

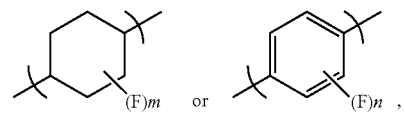

wherein F is fluorine, m is a positive integer from 1 to 8, and n is a positive integer from 1 to 4; $Y^1$ and $Y^2$ are independently —O—, —$CH_2CH_2$—, —CH=CH—, —C(O)O—, or —$CH_2$O—; and $R^1$, $R^2$ are independently substituted or non-substituted $C_1$-$C_{10}$ linear alkyl, wherein substituents of the substituted $C_1$-$C_{10}$ linear alkyl are independently —F, —Cl, —$OCF_3$, —NCS, or —CN, wherein a number of backbone carbon atoms in each of —$Y^1R^1$ and —$Y^2R^2$ is larger than 3.

11 Claims, 1 Drawing Sheet

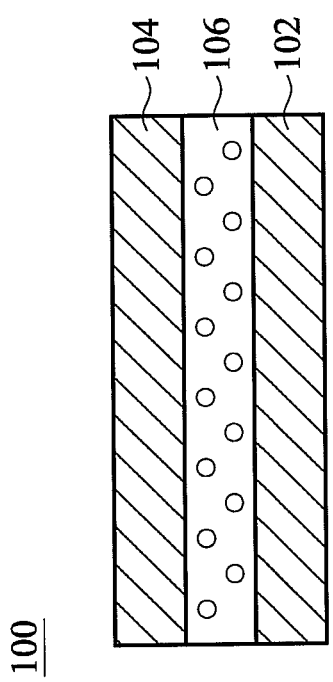

CHIRAL DOPANTS, LIQUID CRYSTAL MATRIX AND MANUFACTURING METHOD THEREOF AND LIQUID CRYSTAL DISPLAY

CROSS REFERENCE TO RELATED APPLICATIONS

This Application claims priority of Taiwan Patent Application No. 100132535, filed on Sep. 9, 2011, the entirety of which is incorporated by reference herein.

BACKGROUND OF THE DISCLOSURE

1. Field of the Invention

The present invention relates to chiral dopants, and in particular relates to chiral dopants used in cholesterol liquid crystals.

2. Description of the Related Art

A cholesterol liquid crystal display is a display using ambient light as a light source, and therefore a backlight module is not required, saving manufacturing costs. A cholesterol liquid crystal display has bistable characteristics, including a planar state and a focal conic state. Advantages of a cholesterol liquid crystal display include low-electricity consumption and high reflection rate, and capability of reflecting various wavelengths, making it particularly suitable for electronic books.

Cholesterol liquid crystals can be classified into two types, including: (1) nematic liquid crystal molecules which are chiral molecules; or (2) a combination of chiral molecules and achiral nematic liquid crystal molecules, which is generally used in modern cholesterol liquid crystal displays, wherein the pitch of the liquid crystal is controlled by the ratio of the chiral molecules to the achiral nematic liquid crystal molecules in the mixture. According to Bragg's reflection law, the relationship between reflection wavelength ($\lambda$) and the pitch (P) of the cholesterol liquid crystal layer can be expressed by $\lambda = P \times n$, wherein n is birefringence of the cholesterol liquid crystals.

The ability of a chiral molecule to twist liquid crystals is defined as helical twisting power (HTP.) The relationship between the helical twist power, pitch, and concentration of the chiral molecules in the nematic liquid crystal composition can be expressed by $HTP \times c = 1/P$, wherein c is concentration of chiral molecules in the nematic liquid crystal composition. As shown in above formula, under a constant pitch, the larger the HTP, the lower the required chiral molecule concentration. Since the addition of chiral molecules will increase the viscosity of the composition, resulting in an increase of the driving voltage of the display and a decrease of the reflection rate, it could be advantageous to increase the HTP value of the chiral molecules to reduce the amount of the chiral molecules required, and thus alleviating the problems such as high viscosity, high driving voltage, and low reflection rate.

Liquid crystal compositions can be generally classified into active matrix compositions and passive matrix compositions. In passive matrix liquid crystal displays, the orientation of the liquid crystals are controlled through voltage applied by a passive device such as a capacitor. On the other hand, in active matrix liquid crystal displays, voltage is applied by an active display such as a transistor. One problem with the existing chiral compounds is that a high HTP generally accompanies low solubility (usually less than 3%) in an active liquid crystal composition.

BRIEF SUMMARY OF THE DISCLOSURE

An embodiment of the invention provides a chiral dopant having the following formula:

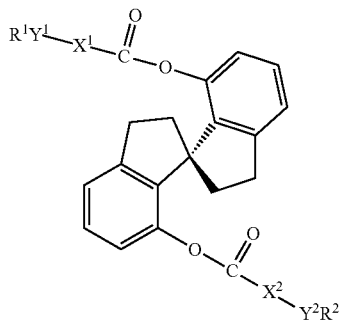

wherein $X^1$ and $X^2$ are independently

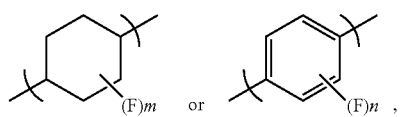

wherein F is fluorine, m is a positive integer from 1 to 8, and n is a positive integer from 1 to 4; $Y^1$ and $Y^2$ are independently —O—, —CH$_2$CH$_2$—, —CH═CH—, —C(O)O—, or —CH$_2$O—; and $R^1$, $R^2$ are independently substituted or non-substituted $C_1$-$C_{10}$ linear alkyl, wherein substituents of the substituted $C_1$-$C_{10}$ linear alkyl are independently —F, —Cl, —OCF$_3$, —NCS, or —CN, wherein a number of backbone carbon atoms in each of —$Y^1R^1$ and —$Y^2R^2$ is larger than 3.

Another embodiment of the invention provides a liquid crystal composition, comprising: a liquid crystal monomer; and the chiral dopant described previously.

Another embodiment of the invention provides a liquid crystal display, comprising: a first substrate; a second substrate disposed opposite to the first substrate; and a liquid crystal layer disposed between the first substrate and the second substrate, wherein the liquid crystal layer comprises the liquid crystal composition described previously.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 is cross section of a liquid crystal display according to one embodiment of the disclosure.

DETAILED DESCRIPTION OF THE DISCLOSURE

The following description is of the best-contemplated mode of carrying out the invention. This description is made for the purpose of illustrating the general principles of the invention and should not be taken in a limiting sense. The scope of the invention is best determined by reference to the appended claims.

Moreover, the formation of a first feature over and on a second feature in the description that follows may include embodiments in which the first and second features are formed in direct contact, and may also include embodiments in which additional features may be formed between the first and second features, such that the first and second features may not be in direct contact.

Chiral dopants that can be used in cholesterol liquid crystal displays are provided in the disclosure, wherein the chiral dopants have high helical twisting power and good solubility in cholesterol liquid crystal compositions.

A chiral dopant of the disclosure may have a following formula (1):

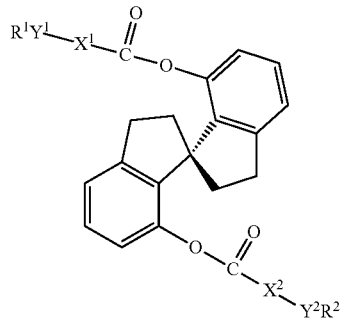

(1)

wherein $X^1$ and $X^2$ are independently

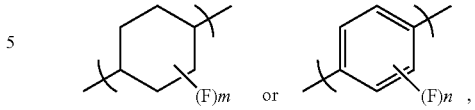

wherein F is fluorine, m is a positive integer from 1 to 8, 1 to 4, or 1 to 2. n is a positive integer from 1 to 4 or 1 to 2. $Y^1$ and $Y^2$ are independently —O—, —CH$_2$CH$_2$—, —CH=CH—, —C(O)O—, or —CH$_2$O—. $R^1$, $R^2$ are independently substituted or non-substituted $C_1$-$C_{10}$ linear alkyl, wherein substituents of the substituted $C_1$-$C_{10}$ linear alkyl are independently —F, —Cl, —OCF$_3$, —NCS, or —CN, wherein a number of backbone carbon atoms in each of —$Y^1R^1$ and —$Y^2R^2$ is larger than 3. For example, the number of backbone carbon atoms in each of —$Y^1R^1$ and —$Y^2R^2$ is from 3 to 10. In one embodiment, $X^1$ and $X^2$ have the same structure, $Y^1$ and $Y^2$ have the same structure, and $R^1$ and $R^2$ have the same structure. In another embodiment, $Y^1$ and $Y^2$ are independently —O— or —CH$_2$O—. In another embodiment, $R^1$, $R^2$ are independently non-substituted $C_1$-$C_{10}$ linear alkyl or fluorine substituted $C_1$-$C_{10}$ linear alkyl.

Examples of the chiral dopants are shown in table 1. However, these structures are, of course, merely examples and are not intended to be limiting.

TABLE 1

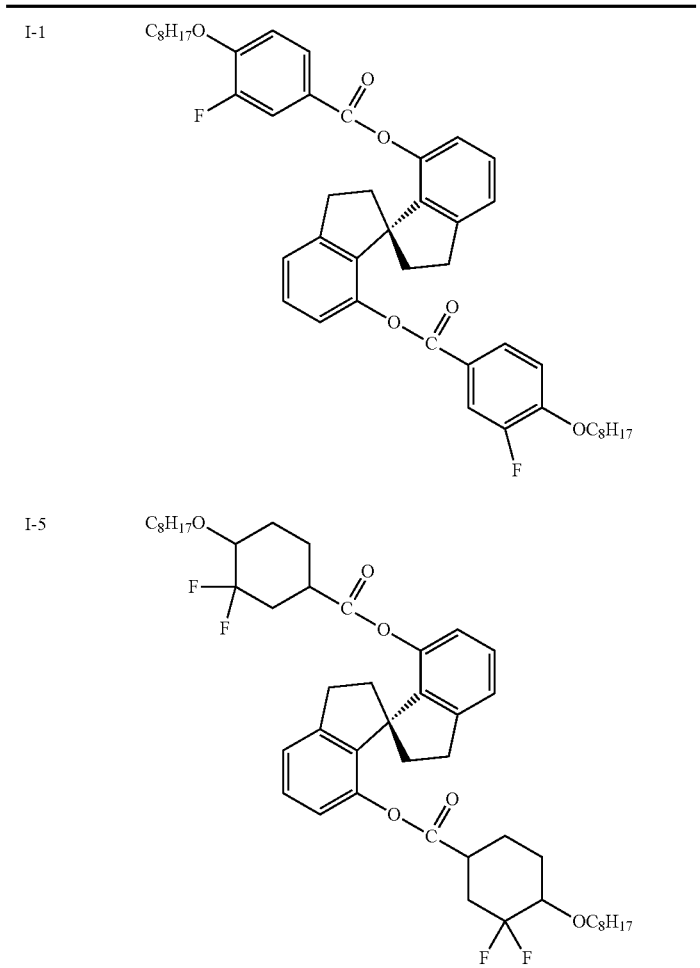

TABLE 1-continued
T-2
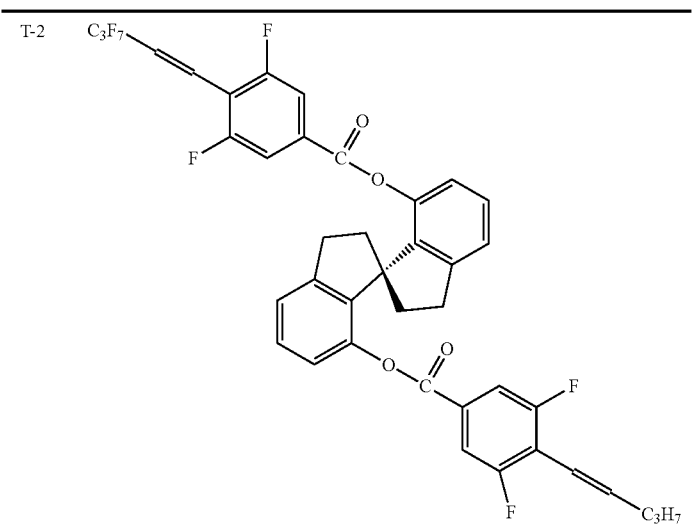
T-4
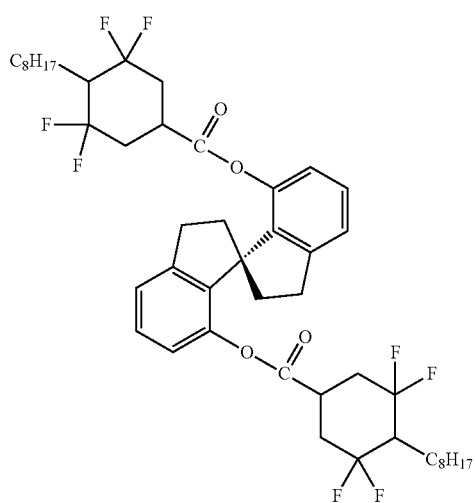
T-6
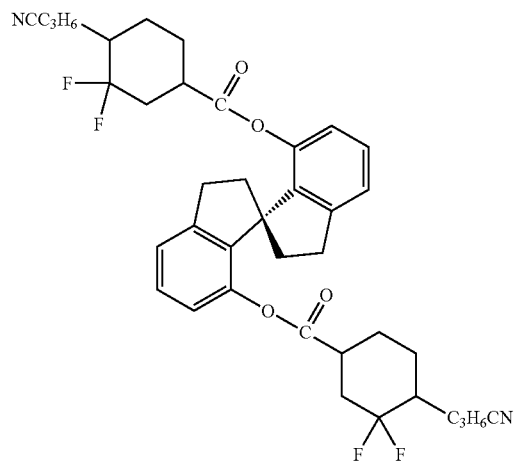

TABLE 1-continued
T-8
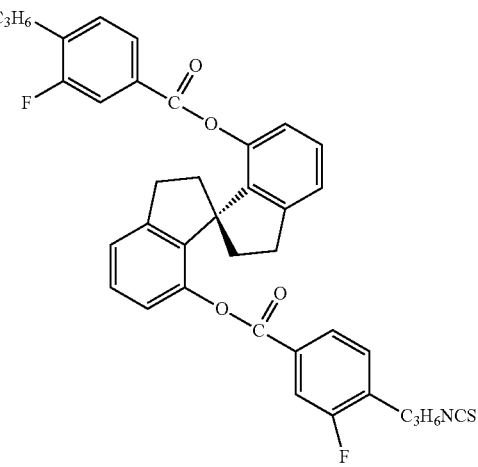
I-4
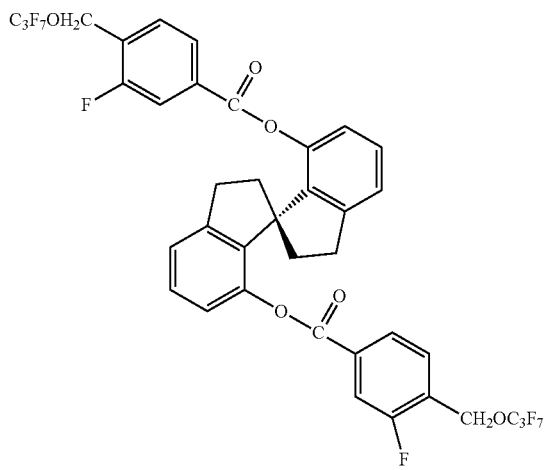
T-1
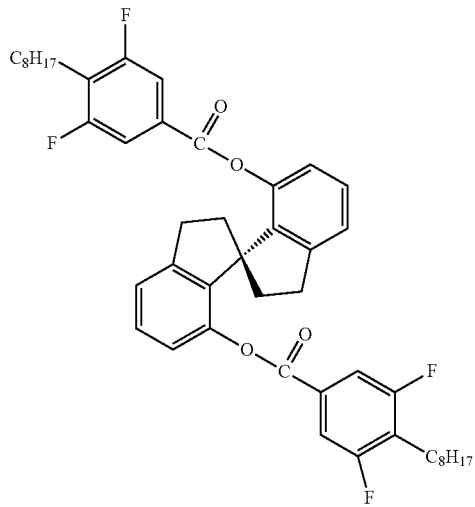

TABLE 1-continued
T-3 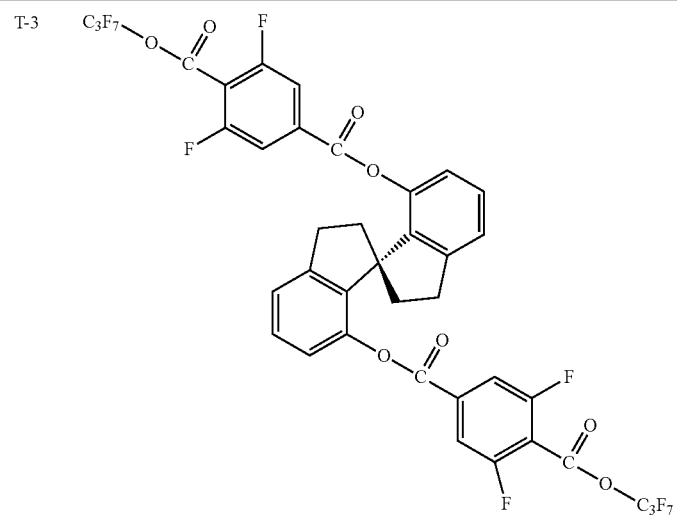
T-5 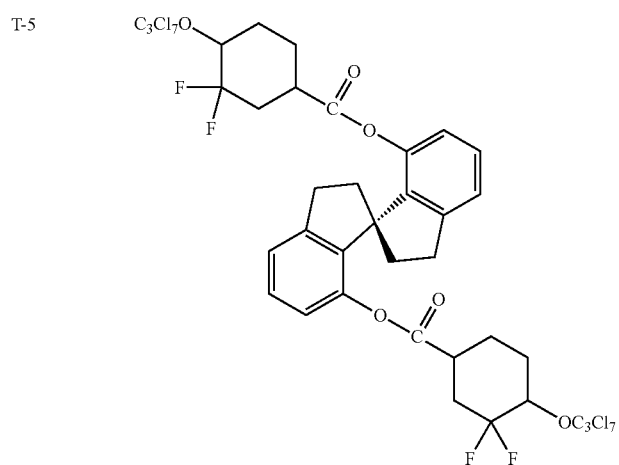
T-7 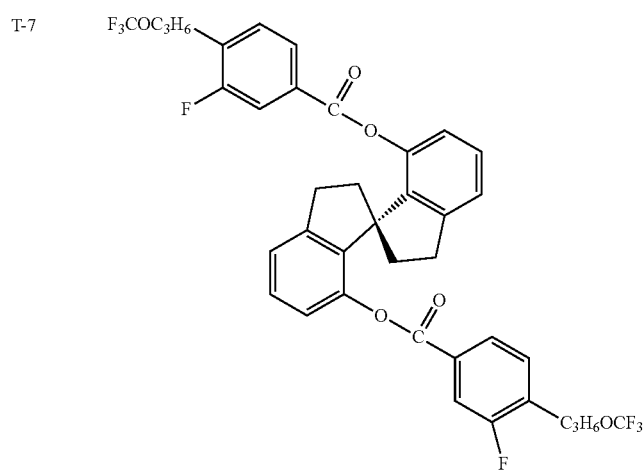

TABLE 1-continued

T-9
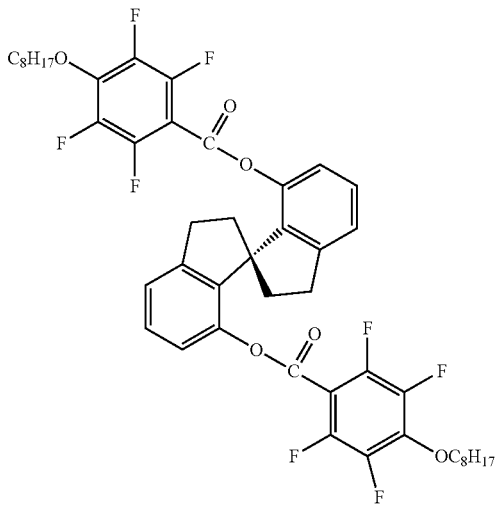

The chiral dopants may be synthesized by any known or future developed technique. For example, the chiral dopant I-1 can be synthesized by the process described below. First, 3-hydroxybenzaldehyde and acetone are mixed and reacted with each other to obtain a bright yellow product. The bright yellow product is dissolved in ethyl acetate (EA), and RaNi is also added into the mixture as a catalyst. The reaction proceeds under a hydrogen atmosphere. The mixture is then concentrated under reduced pressure to obtain a viscous liquid. The viscous liquid is dissolved in acetonitrile and reacted with $Br_2$, and 5-Bis(5-bromo-3-hydroxyphenyl)-1,4-pentan-3-one is obtained. Next, methyl sulfuric acid is added into the 5-Bis(5-bromo-3-hydroxyphenyl)-1,4-pentan-3-one to obtain dibromospirobiindane as a grayish white solid product. The dibromospirobiindane is then reacted at the procedure using ethyl acetate, distilled water, triethylamine, and Pd/C (catalyst) under hydrogen atmosphere to obtain recemic diol as a white solid product. The recemic diol product is then dissolved in ethyl acetate, and then triethylamine, 4-dimethylaminopyridine, and (-)-methyl chloroformate are also added into the mixture to obtain (S)-bis-carbonate as a colorless solid product. (S)-bis-carbonate is dissolved in tetrahydrofuran (THF), and hydrazine hydrate is added to form a colorless and highly chiral solid S-enantiomer product. The product is again dissolved in THF, and then triethylamine, 4-dimethylaminopyridine, and 3-flour-4-octyloxy-benzoyl chloride are added to form the chiral dopant I-1 in table 1. Other chiral dopants in other embodiments of the disclosure can also be synthesized in a similar procedure as described above. However, the procedure is, of course, is merely an example and is not intended to be limiting.

FIG. 1 is a cross-section view of a liquid crystal display according to one embodiment of the disclosure. Referring to FIG. 1, a cholesterol liquid crystal display 100 includes a first substrate 102, a second substrate 104, and a liquid crystal layer 106. The second substrate 104 and the first substrate 102 are disposed opposite to each other, and the liquid crystal layer 106 is disposed between the first substrate 102 and the second substrate 104. The liquid crystal layer 106 further includes the chiral dopants having a structure of formula (1), wherein the concentration of the chiral dopants in the liquid crystal layer may be, but not limited to, between 4 wt % to 9 wt %. In one embodiment, the liquid crystal display is an active liquid crystal display, including arrays of a plurality of pixels, wherein each pixel may include a thin film transistor and a storage capacitor. In another embodiment, the liquid crystal display is a passive liquid crystal display, wherein a first electrode is disposed on the first substrate along a first direction and a second electrode is disposed on the second substrate along a second direction, perpendicular to the first direction. However, these structures of the liquid crystal displays are, of course, merely examples and are not intended to be limiting. Any well-known or future developed liquid crystal display structure can be used. For example, the liquid crystal display structures described in United States Patent Publication No. 20080122998 or No. 20110058136 can also be used.

In general, chiral molecules with high HTP value have poor solubility in an active matrix liquid crystal composition. However, the present inventor discovered that a chiral dopant, having a biindine structure bonding to a fluorine substituted six carbon ring as a main structure and with the number of backbone carbon atoms in each of $—Y^1R^1$ and $—Y^2R^2$ is larger than 3, not only have a high HTP value (such as over 70 $\mu m^{-1}$) but also have good solubility in an active liquid crystal composition. For example, the solubility of the chiral molecules in an active liquid crystal composition is above 4%, for example, in a range between 4% and 9%.

In addition, experiments show that in order to have a higher solubility, the chiral dopants having a structure of formula (1) should have one or more fluorine substituents on the six carbon ring and each of $R^1$ and $R^2$ should be a linear chain. When $R^1$ and $R^2$ are non-linear chains, for example, when there is a benzyl ring on the main chain, the chiral molecule can not achieve satisfactory solubility in a liquid crystal layer even if the number of backbone carbon atoms in each of $—Y^1R^1$ and $—Y^2R^2$ is larger than 3.

EXAMPLE 1

Synthesis of a Chiral Dopant I-1

Step 1:
Under room temperature, 42.08 g (700 mmol) of KOH was dissolved in 180 mL of EtOH solution. The solution was cooled to 5° C. in an ice bath. Then, 73.2 g (600 mmol) of 3-hydroxybenzaldehyde was slowly added into the solution.

Next, 22.05 mL (300 mmol) of acetone was added dropwise into the solution by a feed pipe and stirred for about 30 minutes in an ice bath. The ice bath was removed and the solution was continued to be stirred for another 4.5 hrs. The resulting red solution was then added into 300 mL of ice water. Then, 45 mL of acetic acid was added to neutralize the solution, and the red solution transformed? into a bright yellow sludge. The bright yellow sludge was stirred for 15 minutes and poured into an extraction bottle. The extraction bottle was left standing for ten minutes, and the bright yellow sludge in the bottom of the bottle was collected. The sludge was washed by a great amount of water and then air dried. 52.03 g (195.54 mmol) of the bright yellow solid was obtained (yield: 65.03%). The reaction can be expressed by the following equation:

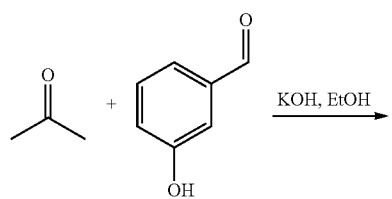

Step 2:

Next, 50.00 g (187.91 mmol) of the resulting product of step 1 was dissolved in 188 mL of ethyl acetate. 1.5 g of RaNi was used as a catalyst, and the reaction was performed under hydrogen atmosphere at room temperature. After the reaction continued for 10 hrs, thin layer chromatography (TLC: $SiO_2$) was used to confirm completion of the reaction. Then, the mixture was carefully filtered by diaomaceeous earth, and a small amount of EA was used to wash the reaction flask. Finally, the mixture was concentrated under reduced pressure and 48.32 g (178.88 mmol) of a viscous liquid was obtained (yield: 95.19%). The reaction can be expressed by the following equation:

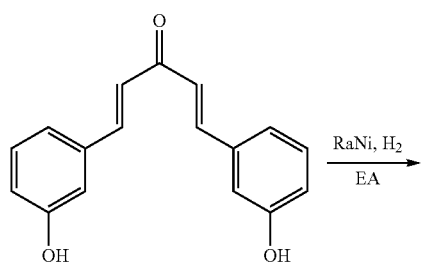

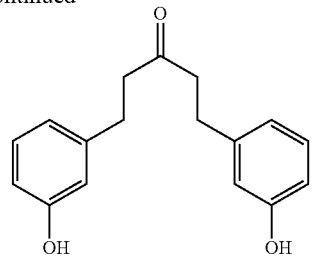

Step 3:

In an ice bath, 15.0 g (55.52 mmol) of the resulting product of step 2 was dissolved in 55 mL of acetonitrile, and 0.06 mL (1.2 mmol) of Br) was also added into the mixture. Then, 19.8 g (111.1 mmol) of N-bromosuccinimide (NBS) was divided into four parts and added into the mixture separately. TLC was used to confirm completion of the reaction. Next, a rotavapor was used to concentrate the product and byproduct (succinimide). The mixture was added into water (150 mL) at 55° C. and stirred for about 1 hr to remove the byproduct. Then, suction filtration was performed, and the solid product was washed by a small amount of water. The solid was then air dried. 22.69 g (53.2 mmol) of a skin-colored product 5-bis(5-bromo-3-hydroxyphenyl)-1,4-pentan-3-one was obtained (yield: 95.19%). The reaction can be expressed by the following equation:

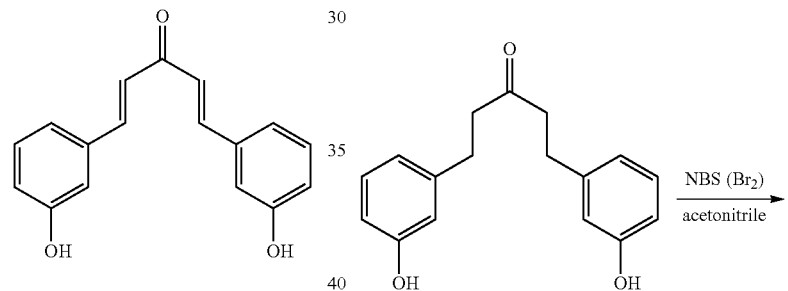

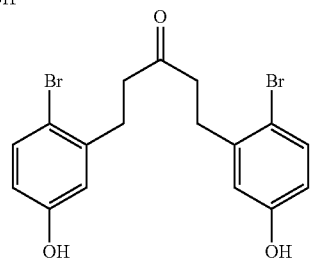

Step 4:

Under room temperature, 1 L (15.4 mol) of methyl sulfuric acid was slowly added into a flask containing 160.5 g (0.375 mol) of the resulting product 5-bis(5-bromo-3-hydroxyphenyl)-1,4-pentan-3-one from step 3. The mixture was stirred thoroughly. After about 1.5 hrs, 2 Kg of ice was added into the flask and stirred thoroughly, and then 1 L of toluene and 50 g of diatomaceous earth were also added into the flask. After stirring, the diatomaceous earth was filtered. The resulting solid was then washed by toluene, and the organic layer after filtration was extracted by distilled water (0.5 L). After extraction, the organic layer was filtered and dehydrated by $Na_2SO_4$. Then, the product was concentrated under reduced pressure to remove the solvent. The crude product was dissolved in 300 mL of diisopropyl ether (IPE), and then 1.2 L of heptane was added and the mixture was stirred vigorously for 30 minutes to form a sludge. Then, the mixture was filtered and washed by 1:5 (v/v) of IPE: heptane. A grayish white solid product of dibromospirobiindane was obtained (yield: 60.0%). The melting point of the resulting product was 90-94° C. The reaction can be expressed by the following equation:

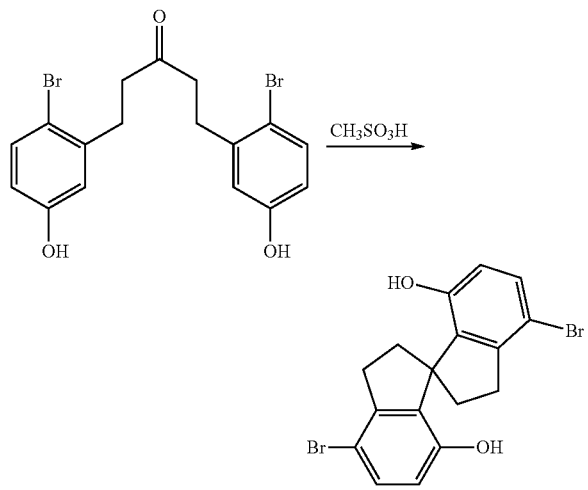

Step 5:

102.4 g (0.250 mol) of dibromospirobiindane in step 4 was placed into a flask. 700 mL of EA, 200 mL of distilled water, 70 mL (0.51 mol) of triethylamine, and 102. g of Pd/C catalyst (10% Pd/C) were added into the flask under hydrogen atmosphere. Gas chromatography was used to confirm completion of the reaction. The mixture was then filtered by diatomaceous earth, and the resulting organic layer was washed by 5% of $HCl_{(aq)}$ solution. The organic layer was then dehydrated by sodium sulfate and filtered. Then, the product was concentrated under reduced pressure to remove the solvent. 50 mL of heptane was used to wash the product for three times to obtain racemic diol as a white solid product (yield: 90%). The melting point of the resulting product was 116-119° C. The reaction can be expressed by the following equation:

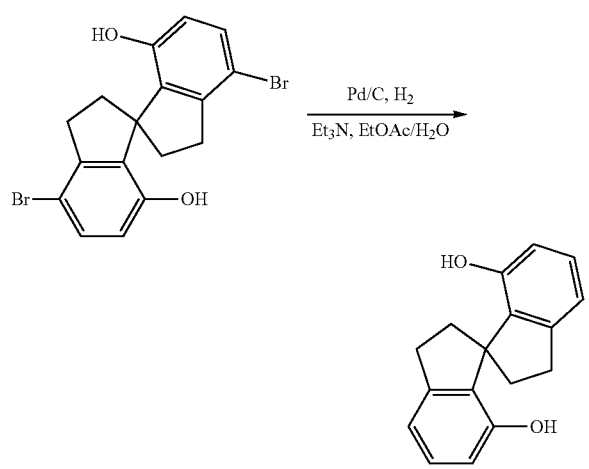

Step 6:

44.1 g (0.175 mol) of racemic diol from step 5 was dissolved in 400 mL EA. In an ice bath, 60 mL (0.42 mol) of triethylamine, and 2.1 g (0.017 mol) of 4-dimethylaminopyridine was also added. Then, 80 mL (0.37 mol) of (−)-methyl chloroformate was slowly added into the mixture. The mixture was then kept at a low temperature for 30 minutes. After 30 minutes, 300 mL of a 5% $HCl_{(aq)}$ solution was added into the mixture in the ice bath. The mixture was filtered, and the resulting solid was dissolved in 150 mL of THF. The resulting THF solution was combined with the organic layer of the filtration, and the combined mixture was dehydrated by sodium sulfate and then the mixture was filtered. Then, the product was concentrated under reduced pressure to remove the solvent. 250 mL of heptane was then added into the resulting product and stirred for 30 minutes in an acetone/ice bath. Finally, the mixture was filtered, and the resulting solid was washed by heptane. The product was then air dried to obtain (S)-bis-carbonate ((S)-9) as a colorless solid product (yield: 41%). The melting point of the resulting product was 186-187° C. The reaction can be expressed by the following equation:

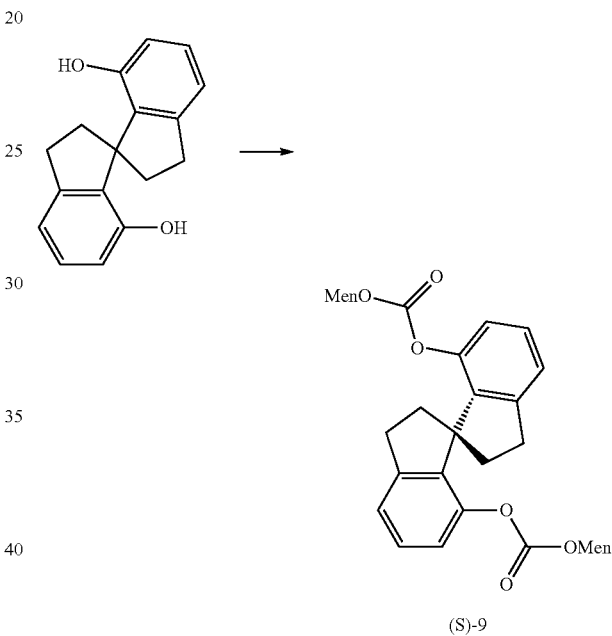

Step 7:

41.1 g (66.6 mmol) of (S)-bis-carbonate was dissolved in 50 mL of tetrahydrofuran (THF), and then 16 mL (333 mmol) of hydrazine hydrate was added into the mixture. The mixture was heated and reflux for 80 minutes. After 80 minutes, 250 mL of a cold $NaOH_{(aq)}$ solution (5%) was added into the reaction flask. The mixture was then extracted by 200 mL of diisopropyl ether, and the water layer was removed from the flask. Then, 100 mL of $NaOH_{(aq)}$ solution (5%) was used to extract the organic layer, and the water layer was also removed from the flask. Two water layers were then combined as a mixed water layer. 65 mL of $HCl_{(conc)}$ (pH≦2) was carefully added into the mixed water layer. Precipitant occurred at this step. The mixed solution was cooled to below 5° C. by an ice bath, and then the mixture was filtered to obtain the solid product. The solid product was washed by a small amount of water and air dried. A colorless product (as shown by (S)-3) was formed (yield: 97.0%). The melting point of the resulting product was 157-159° C. Chiral High Performance Liquid Chromatography (HPLC) was used to analyzed the product, wherein 99.5% of the product was the S-enantiomer product and its enantiomeric excess (ee) was 99.0%. The reaction can be expressed by the following equation:

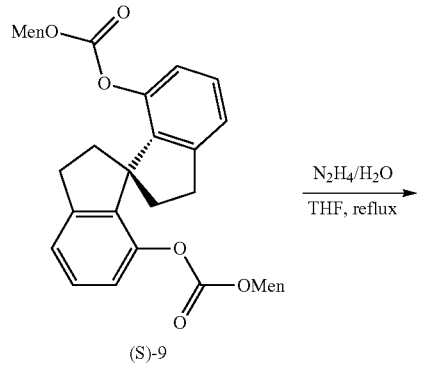

(S)-9

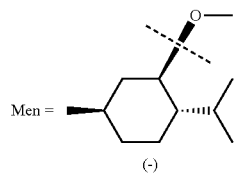

Step 8:

3.3 g (13.06 mmol) of the resulting product (S)-3 from step 7 was dissolved in 30 mL of THF. Then, in an ice bath condition (temperature was below 5° C.), 4.55 mL (32.65 mmol) of triethylamine and 0.16 g (1.31 mmol) of 4-dimethylaminopyridine were also added into the mixture. Then, 5.66 g (26.12 mmol) of 3-flour-4-octyloxy-benzoyl chloride was also slowly added into the mixture, wherein the reaction was slightly exothermic and white precipitant was formed. After the temperature of the mixture became about equal to room temperature, the mixture was stirred for 2 hrs. After 2 hrs, 50 mL of a 5% $HCl_{(aq)}$ was added into the mixture in an ice bath condition. Then, 20 mL of EA was used to extract the mixture, and the resulting organic layer was dehydrated by sodium sulfate and was then filtered. The filtrate was concentrated under reduced pressure to remove the solvent. All resulting solid was dissolved in 10 mL of THF, and then 30 mL of methanol was also added. The mixture was left standing until solid precipitation. The precipitant was then again dissolved by THF, and diisopropyl ether was also added. The mixture was filtered to obtain white powder I-1 (yield: 65%). Chiral High Performance Liquid Chromatography (HPLC) was used to analyze the product, wherein 99.5% of the product was the S-enantiomer product and its enantiomeric excess (ee) was 99.0%. The reaction can be expressed by the following equation:

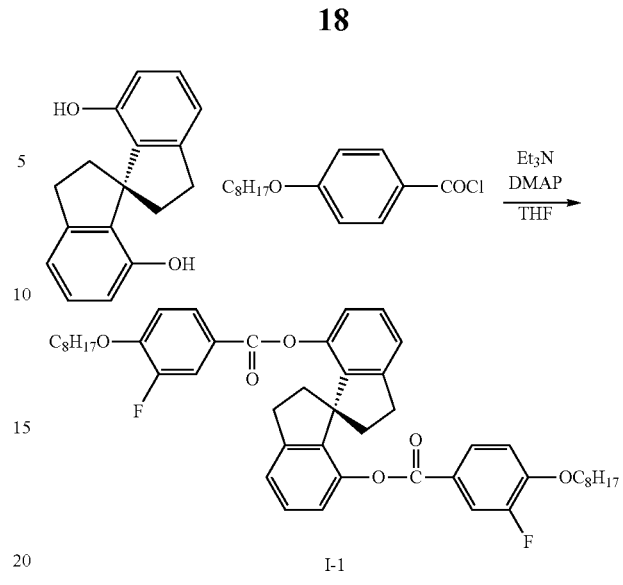

EXAMPLE 2

Synthesis of a Chiral Dopant I-4

The same procedure as in example 1 was repeated in example 2 except that in step 8, 3-fluoro-4-methoxymethyl chloride was used to replace the 3-flour-4-octyloxy-benzoyl chloride. The yield of the resulting product I-4 was about 65%. A Chiral High Performance Liquid Chromatography (HPLC) was used to analyze the product, wherein 99.5% of the product was the S-enantiomer product and its enantiomeric excess (ee) was 99.0%. The resulting product I-4 can be expressed by the following formula:

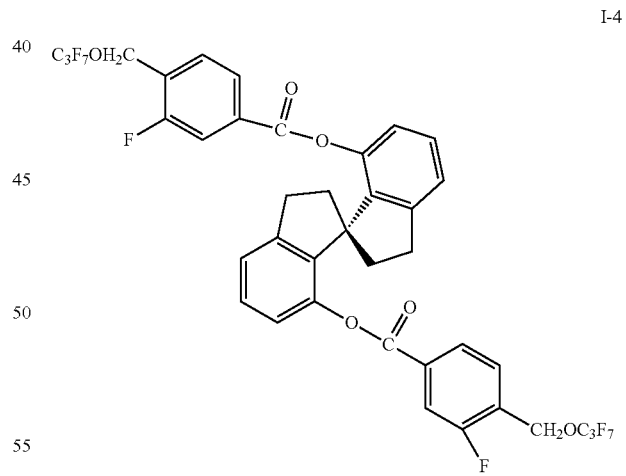

EXAMPLE 3

Synthesis of a Chiral Dopant I-5

The same procedure as in example 1 was repeated in example 3 except that in step 8, 3,3-difluoro-4-octyloxy-cyclohexanecarbonyl chloride was used to replace the 3-flour-4-octyloxy-benzoyl chloride. The yield of the resulting product I-5 was about 64%. A Chiral High Performance Liquid Chromatography (HPLC) was used to analyze the product, wherein 99.5% of the product was the S-enantiomer product and its enantiomeric excess (ee) was 99.0%. The resulting product I-5 can be expressed by the following formula:

I-5

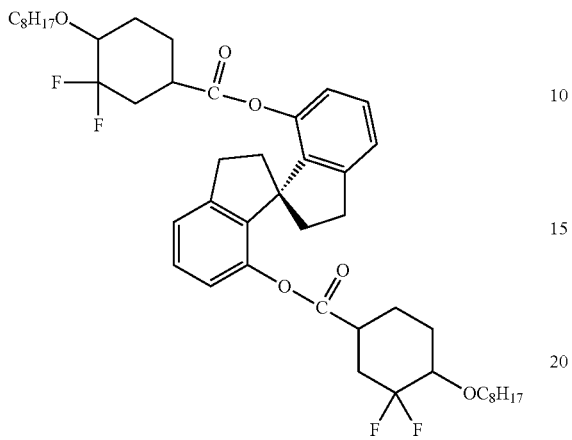

COMPARATIVE EXAMPLE 1

The same procedure as in example 1 was repeated in comparative example 1 except that in step 8, 3,4,5-trifluoro-benzoyl chloride (I-2), 2,3,5,6-tetrafluoro-4-methyl-benzoyl chloride (I-3), 3,5-difluoro-4-[2-(4-isothiocyanato-phenyl)-vinyl]-benzyl chloride (I-6), 4-cyano-benzoic acid 4-chlorocarbonyl-2-fluoro-phenyl ester (I-7), 4-methoxy-benzoic acid 4-chlorocarbonyl-phenylester (K-1), or biphenyl-4-carbonyl chloride (K-2) were respectively used to replace the 3-flour-4-octyloxy-benzoyl chloride. The yield of the resulting products I-2, I-3, I-6, I-7, K-1 and K-2 were respectively about 65%, 65%, 63%, 66%, 66%, and 62%. A Chiral High Performance Liquid Chromatography (HPLC) was used to analyze the product, wherein 99.5% of the product was the S-enantiomer product and its enantiomeric excess (ee) was 99.0%. The resulting products I-2, I-3, I-6, I-7, K-1 and K-2 can be expressed by the following formula:

I-2

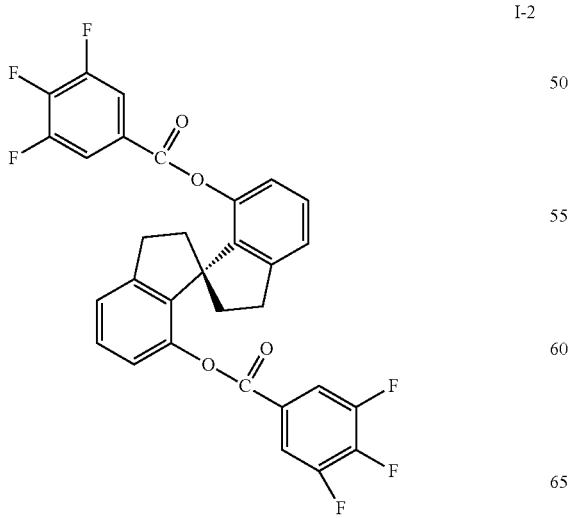

-continued

I-3

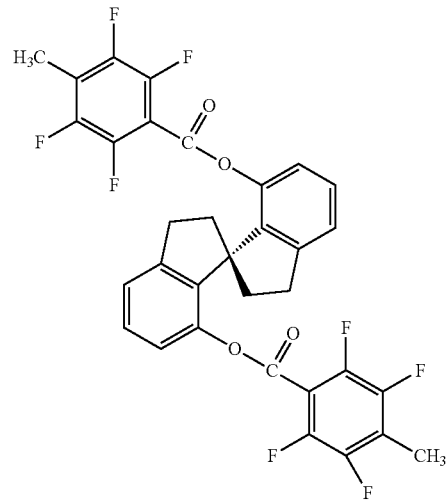

I-6

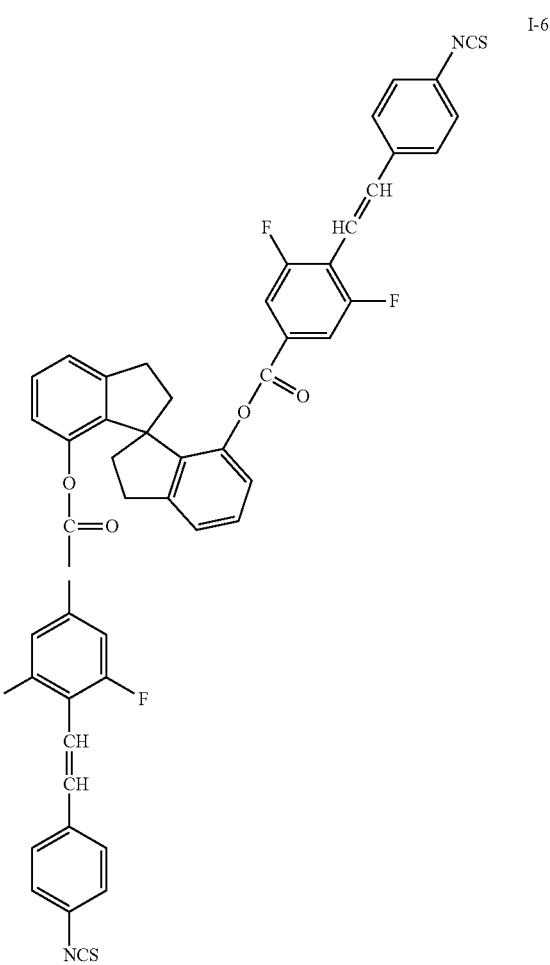

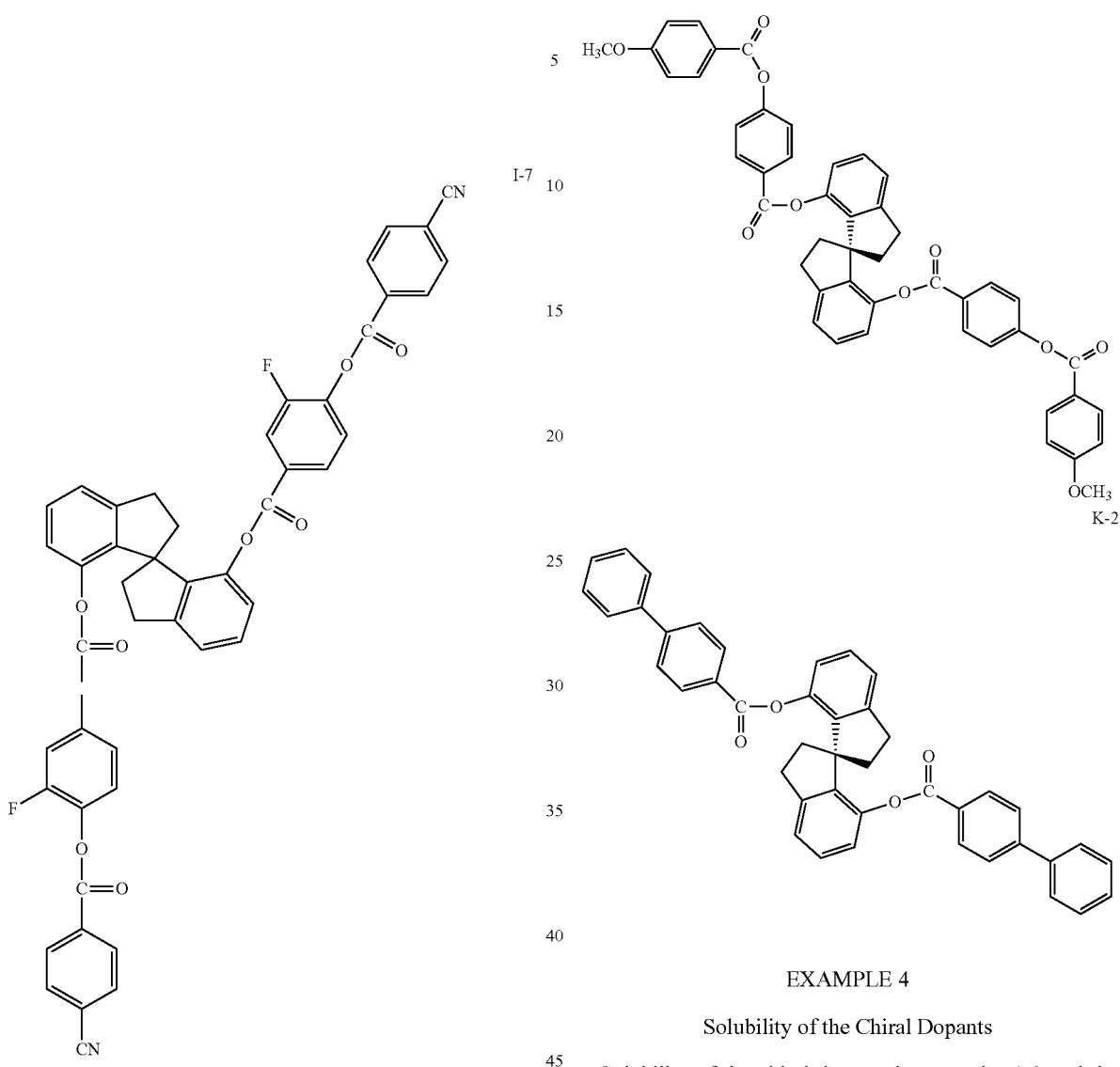
EXAMPLE 4
Solubility of the Chiral Dopants
Solubility of the chiral dopants in examples 1-3 and the comparative example 1 and the commercial chiral dopants in a passive matrix composition (PM) and active matrix composition (AM) were analyzed. The commercial chiral dopants include M-1 (Merck R-811), M-2 (Merck R-1011), M-3 (Merck) and M-4 (Merck), which can be expressed by the following formula:
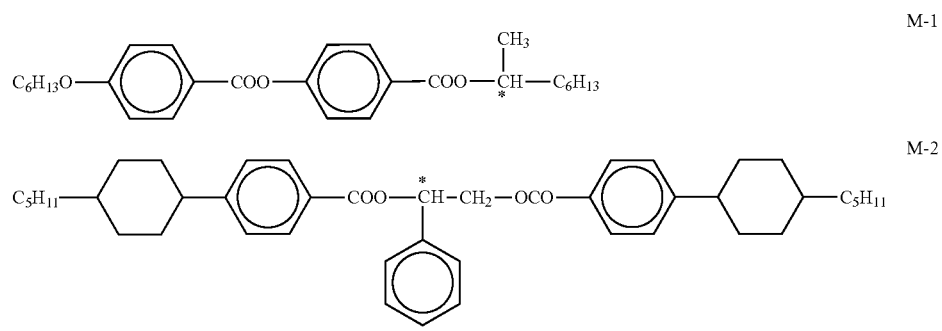

-continued

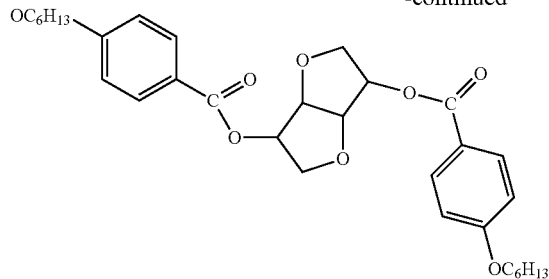

M-4

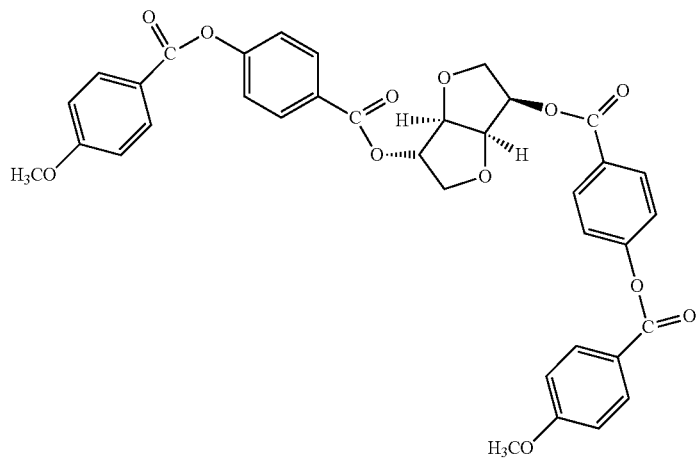

In addition, the passive matrix composition (PM) and the active matrix composition (AM) were bought from Suzhou Synthetic Chemical Co., Ltd, wherein the components of the passive matrix composition (PM) and the active matrix composition (AM) were as shown in table 2 and table 3.

TABLE 2

| PM liquid crystal composition | |
|---|---|
| monomer | wt % |
| $C_5H_{11}$—⟨⟩—⟨⟩—CN | 51 |

TABLE 2-continued

| PM liquid crystal composition | |
|---|---|
| monomer | wt % |
| $C_7H_{15}$—⟨⟩—⟨⟩—CN | 25 |
| $C_8H_{17}O$—⟨⟩—⟨⟩—CN | 16 |
| $C_5H_{11}$—⟨⟩—⟨⟩—⟨⟩—CN | 8 |

TABLE 3

| AM liquid crystal composition | |
|---|---|
| monomer | wt % |
| $C_2H_5$—⟨⟩—⟨⟩(F)—⟨⟩—⟨⟩—$C_5H_{11}$ | 12 |
| $C_2H_5$—⟨⟩—≡—⟨⟩—COO—⟨⟩(F,F) | 16 |

TABLE 3-continued

| AM liquid crystal composition | |
|---|---|
| monomer | wt % |
| $C_5H_{11}$—〈benzene〉—C≡C—〈benzene〉—COO—〈benzene(F,F)〉 | 18 |
| $C_2H_5$—〈benzene〉—C≡C—〈benzene〉—COO—〈benzene〉—$CH_3$ | 18 |
| $C_3H_7$—〈benzene〉—C≡C—〈benzene〉—COO—〈benzene(F,F)〉 | 18 |
| $C_2H_5$—〈benzene〉—C≡C—〈benzene〉—COO—〈benzene-F〉 | 18 |

The solubility of the chiral dopants was analyzed by the following procedure. First, 5 wt %, 10 wt %, 15 wt %, or 20 wt % of the chiral dopants were added into flasks containing the liquid crystal composition as shown in table 2 and table 3 respectively, and the flasks were left standing over night. Then, each flask was examined to see whether precipitate occurred.

Referring to table 4 (as shown below), HTP values of all the commercial chiral dopants M-1, M-2, M-3, and M-4 were less than 70 μm$^{-1}$, and therefore, they were not chiral dopants with a high HTP value. Moreover, compared to the structure of formula (1), the chiral dopants I-2 and I-3 had poor solubility in the active matrix composition (less than 4%), although their HTP values were above 70 μm$^{-1}$. The reason for the poor solubility may be due to the para-position of the fluorine substituted 6 carbon ring which bonded to the main structure biindane not having a long linear chain (a number of backbone carbon atoms in each of —$Y^1R^1$ and —$Y^2R^2$ was less than 3).

Furthermore, although the chiral dopants K-1, K-2, I-6, and I-7 also had a high HTP value and the number of backbone carbon atoms in each of their —$Y^1R^1$ and —$Y^2R^2$ was larger than 3, their solubility in the active matrix composition were still poor, due to the main chain of $R^1$ and $R^2$ not being a linear chain (containing benzyl group). On the other hand, the chiral dopants I-1, I-4, and I-5 of the examples 1-3 not only had high HTP values, but also had good solubility in the active matrix composition (solubility were over 4%), due to the number of backbone carbon atoms in each of their —$Y^1R^1$ and —$Y^2R^2$ being larger than 3 and their main chain of $R^1$ and $R^2$ being a linear chain.

TABLE 4

| | HTP (μm$^{-1}$) | Solubility in PM (wt %) | Solubility in AM (wt %) |
|---|---|---|---|
| M-1 | 21 | 9% | 7% |
| M-2 | 34 | 5% | 6% |
| M-3 | 51 | 8% | 3% |
| M-4 | 56 | 8% | 3% |
| K-1 | 70 | 8% | 3% |
| K-2 | 78 | 8% | 3% |
| I-1 | 78 | 10% | 9% |
| I-2 | 77 | 3% | 3% |
| I-3 | 75 | 4% | 3% |
| I-4 | 76 | 8% | 7% |
| I-5 | 75 | 8% | 7% |
| I-6 | 74 | 8% | 3% |
| I-7 | 75 | 8% | 3% |

Accordingly, in examples 1-3, the chiral dopants had HTP values over 70 μm$^{-1}$. Meanwhile, their solubility in both passive and active matrix compositions were all over 4%, or even all higher than 7%.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A chiral dopant having the following formula:

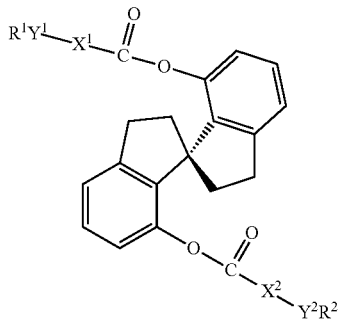

wherein
X$^1$ and X$^2$ are independently

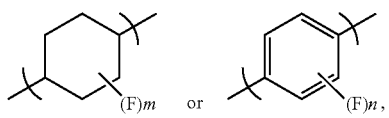

wherein F is fluorine, m is a positive integer from 1 to 8, and n is a positive integer from 1 to 4;
Y$^1$ and Y$^2$ are independently —O—, —CH$_2$CH$_2$—, —CH=CH—, —C(O)O—, or —CH$_2$O—; and
R$^1$, R$^2$ are independently substituted or non-substituted C$_1$-C$_{10}$ linear alkyl, wherein substituents of the substituted C$_1$-C$_{10}$ linear alkyl are independently —F, —Cl, —OCF$_3$, —NCS, or —CN, wherein a number of backbone carbon atoms in each of —Y$^1$R$^1$ and —Y$^2$R$^2$ is larger than 3.

2. The chiral dopant as claimed in claim 1, wherein X$^1$ and X$^2$ have the same structure, Y$^1$ and Y$^2$ have the same structure, and R$^1$ and R$^2$ have the same structure.

3. The chiral dopant as claimed in claim 1, wherein a helical twisting power (HTP) of the chiral dopant is larger than 70 μm$^{-1}$.

4. The chiral dopant as claimed in claim 1, wherein Y$^1$ and Y$^2$ are independently —O— or —CH$_2$O—.

5. The chiral dopant as claimed in claim 1, wherein R$^1$ and R$^2$ are independently non-substituted C$_1$-C$_{10}$ linear alkyl or fluorine substituted C$_1$-C$_{10}$ linear alkyl.

6. The chiral dopant as claimed in claim 1, wherein the chiral dopant has the following formula:

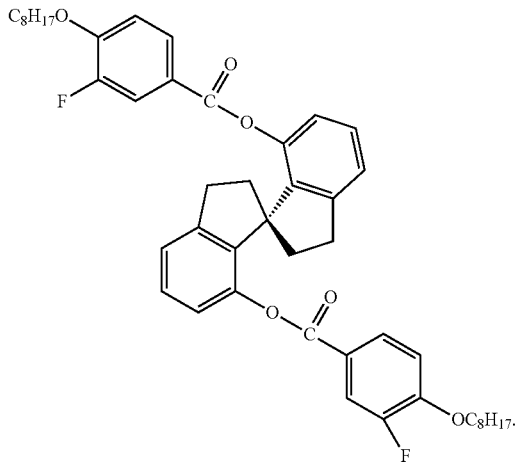

7. The chiral dopant as claimed in claim 1, wherein the chiral dopant has the following formula:

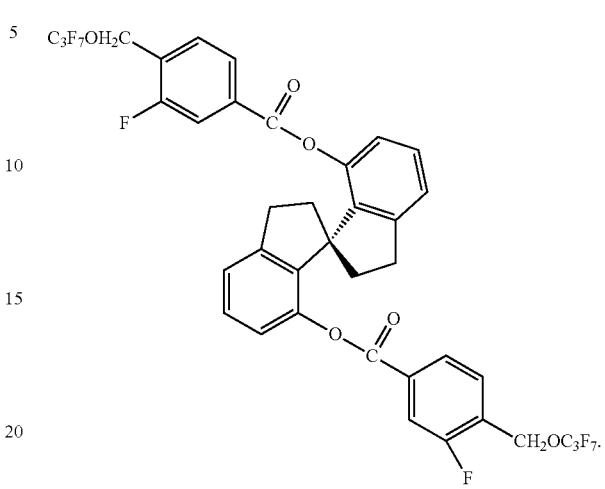

8. The chiral dopant as claimed in claim 1, wherein the chiral dopant has the following formula:

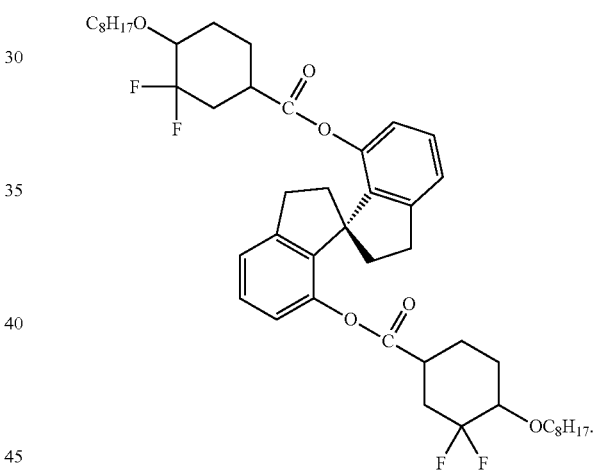

9. A liquid crystal composition, comprising:
a liquid crystal monomer; and
the chiral dopant as claimed in claim 1.

10. A liquid crystal display, comprising:
a first substrate;
a second substrate disposed opposite to the first substrate; and
a liquid crystal layer disposed between the first substrate and the second substrate, wherein the liquid crystal layer comprises the liquid crystal composition as claimed in claim 9.

11. The liquid crystal display as claimed in claim 10, wherein the liquid crystal layer contains 4% to 9% by weight of the chiral dopant.

* * * * *